Aug. 12, 1952  R. T. PEMBERTON ET AL  2,606,870
METHOD AND APPARATUS FOR CONDITIONING LIQUIDS
Filed Aug. 16, 1946
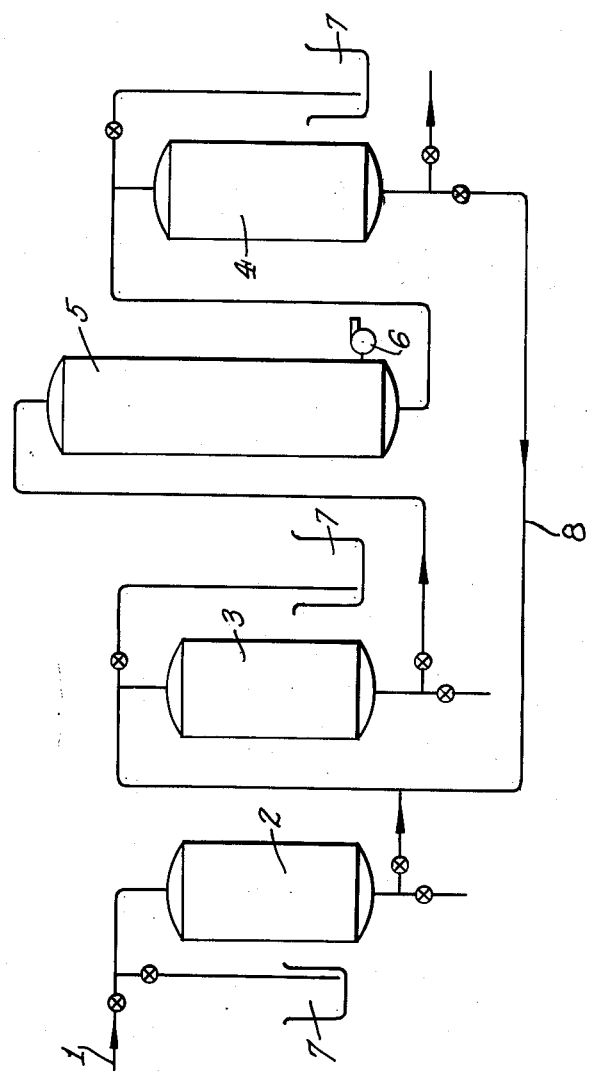
INVENTORS
ROLAND THOMAS PEMBERTON
ERIC LEIGHTON HOLMES
BY Clarence D. Kerr
ATTORNEY Patented Aug. 12, 1952

2,606,870

UNITED STATES PATENT OFFICE 2,606,870

METHOD AND APPARATUS FOR CONDITIONING LIQUIDS

Roland Thomas Pemberton, London, and Eric Leighton Holmes, Northants, England, assignors to The Permutit Company, New York, N. Y., a corporation of Delaware Application August 16, 1946, Serial No. 691,152
In Great Britain August 24, 1945

13 Claims. (Cl. 210—24)

This invention relates to the removal of weak acids from water or other liquids containing both strong and weak acids by treatment of such liquids with anion exchange materials.

It has been recognized for some time that strong acids can be removed from water by passing the water containing them through a bed of granular material, which material may be one of the so-called anion exchange resins such as a metaphenylenediamine resin or those prepared from aliphatic or aromatic amines, amidines, aminotriazines and the like. The exact mechanism by which acid is removed from liquids by such materials is not certain, but regardless of whether the acids are removed by the phenomenon of adsorption or by a true exchange of anions, the ultimate effect is that the water emerging from such a bed can be rendered substantially free from the strong acids. The flow of water through such a bed is continued until the bed is said to be exhausted as indicated by an increase in conductivity on a conductivity meter caused by the presence of strong acids in the effluent water. When the conductivity of the effluent increases substantially, the flow of water is stopped and the bed is then regenerated, usually with a dilute solution of soda ash. Such conductivity meters are relatively unaffected by the presence of weak acids, however.

The treated or effluent water in such a case thus normally contains weak acids, such as carbonic and silicic acids. If the carbonic acid is to be removed, this is usually accomplished by means of a degasifier or a device in which air is used to scrub out and remove carbon dioxide. Ordinary degasifiers or scrubbers, however, do not remove all of the carbonic acid, so that if water is desired with a pH of 7 or more, it is usually necessary to add alkali after the degasifying or scrubbing.

We have observed that anion exchange materials will remove or exchange the anions of both strong and weak acids but that the reaction is selective in that the anions of weak acids which are first taken up by the exchange material will be subsequently expelled in favor of the anions of strong acids as additional liquid containing the strong acids is brought in contact with the exchange material. Accordingly, we propose to control the treatment of such water or other liquids by an anion exchanger in such a manner that the flow of water or other liquid containing both the strong and weak acids is stopped before the weak acids are expelled by the material and appear in the effluent. After the flow of water or other liquid is stopped, the material is regenerated. Sodium carbonate is not satisfactory for such regeneration, and therefore we prefer to use a dilute solution of an alkaline hydroxide such as caustic soda for this purpose.

Our invention may be applied to the treatment of any liquid containing acids of different strengths which are selectively removed by the exchange material during the passage of the first part of the liquid through the material. The particular exchange material used should be one that has a good affinity for the weak acid anions to be removed, as will be readily understood by those skilled in the art.

The figure in the drawing is a diagrammatic showing of one form of apparatus suitable for operation in accordance with our invention.

One example of the application of our invention is the treatment of ordinary water that has been passed through a hydrogen ion exchanger and contains strong acids such as hydrochloric and sulfuric acids and weak acids such as carbonic and silicic acids. This water, containing the different acids, is passed through an anion exchanger, but the flow of water is stopped before substantial quantities of the weak acids appear in the effluent. The exchange material at this stage will possess additional exchange capacity, although such capacity would involve the expelling of the anions of the weak acids already removed from some of the water if additional water containing the sulfuric and hydrochloric acid was brought into contact with it.

Various systems or methods may be used for carrying the invention into effect. For example, the anion exchange bed may be made much larger than usual in order to increase its capacity, or two or more anion exchange beds may be used with the water flowing through one after passing through the other. If it is desired to remove all but negligible quantities of the total dissolved solids in water, the water may of course be passed first through a hydrogen ion exchanger to convert the salts to acids and then through either an anion exchanger of larger size than usual, or through two or more anion exchangers arranged in tandem.

In the case of a large anion exchange bed, it is desirable to arrange the flow connections so that the regenerating solution flows through the bed in reverse direction to the flow of water being treated. When a large bed is regenerated in this manner with an alkaline hydroxide solution such as caustic soda, the exchange material saturated with weak acid anions is regenerated by the caustic soda and this will convert some of the caustic soda to the sodium salts of the weak acids, which then function to regenerate the portion of the bed containing the bulk of the strong acid anions such as chloride and sulfate ions.

When two or more anion exchange beds are used in series, the first bed may be used to remove the strong acids in the usual manner, and this bed may be regenerated in the usual manner by means of a solution of soda ash or the like. The effluent from this first bed still contains most of the weak acids in solution, and the weak acids are then removed as the water or other liquid passes through the second anion exchange bed. In this case, it is important to regenerate the second bed with an alkaline hydroxide solution, and, if desired, the effluent regenerating solution from this second bed may be supplemented with sodium carbonate solution and used to regenerate the first anion exchange bed. Thus, if the first bed removes all or most of the strong acids, they never reach the second anion exchange bed in any quantity and therefore do not displace the weak acid anions taken up by the second bed.

A particularly advantageous arrangement for the treatment of water containing salts of both strong and weak acids, including bicarbonates and silicates, is to pass the water first through a hydrogen ion exchanger and then through an anion exchanger, after which the excess carbon dioxide is removed from the water by means of a degasifier or air scrubber. The effluent from the degasifier is then passed through a second anion exchange bed to remove the last of the weak acids.

Apparatus suitable for such operation is illustrated diagrammatically in the drawing in which the raw water to be treated is fed by the line 1 through a hydrogen ion exchanger 2 and then successively through the anion exchangers 3 and 4. After passing through the anion exchanger 3 which removes most or all of the strong acids, the water may be passed through a degasifier 5 provided with a blower 6 for scrubbing out most of the carbon dioxide in the water. Suitable regenerant tanks 7 and feed pipes may be provided for each of the exchange units 2, 3 and 4.

The hydrogen ion exchanger 2 and the first bed of anion exchanger 3 are operated and regenerated in the usual manner. Instead of the customary procedure, however, the stage at which the anion exchange bed 4 is regenerated can be readily controlled by testing the effluent from this bed and stopping the flow of water through it as soon as the weak acids to be removed from the water begin to appear in the effluent. The bed 4 should be regenerated with an alkaline hydroxide solution and, if desired, the effluent from this regeneration may be returned through the line 8 for use with soda ash solution to regenerate the unit 3. By the foregoing arrangements, utilizing our discoveries, water can be treated to remove virtually all of the dissolved salts including the salts of even the weaker acids.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

1. A process of removing weak acids from water containing both strong and weak acids which comprises flowing such water first through one bed of anion exchanger and then without any further ion exchange treatment through another bed of anion exchanger, regenerating the first bed before substantial quantities of strong acid appear in the effluent therefrom, and regenerating the second bed with a solution of an alkaline hydroxide before substantial quantities of weak acids appear in the effluent therefrom.

2. A process of removing weak acids from water containing both strong and weak acids which comprises flowing such water first through one bed of anion exchanger, then through a degasifier to remove carbon dioxide, and then through another bed of anion exchanger, regenerating the first bed before substantial quantities of strong acids appear in the effluent therefrom, and regenerating the second bed with a solution of an alkaline hydroxide before substantial quantities of weak acids appear in the effluent therefrom.

3. A process of removing dissolved solids from water containing salts of both weak and strong acids which comprises flowing such water through a bed of hydrogen cation exchanger, then through a bed of anion exchanger to remove strong acids, and then without further ion exchange treatment through another bed of anion exchanger to remove weak acids, regenerating said bed of cation exchanger and said first bed of anion exchanger when substantially exhausted, and regenerating said second bed of anion exchanger with a solution of an alkaline hydroxide before substantial quantities of weak acids appear in the effluent therefrom.

4. A process of removing dissolved solids from water containing salts of both weak and strong acids which comprises flowing such water through a bed of hydrogen cation exchanger, then through a bed of anion exchanger to remove strong acids, then through a degasifier to remove carbon dioxide, and then through another bed of anion exchanger to remove weak acids, regenerating said bed of cation exchanger and said first bed of anion exchanger when substantially exhausted, and regenerating said second bed of anion exchanger with a solution of an alkaline hydroxide before substantial quantities of weak acids appear in the effluent therefrom.

5. A process of removing weak acids from water containing both strong and weak acids which comprises flowing such water first through one bed of anion exchanger and then through another bed of anion exchanger, regenerating the first bed before substantial quantities of strong acids appear in the effluent therefrom, and regenerating the second bed with a solution of an alkaline hydroxide before substantial quantities of weak acids appear in the effluent therefrom, the waste regenerant from said second bed being utilized as regenerant for said first bed.

6. Apparatus for conditioning liquid containing salts of both strong and weak acids comprising a hydrogen ion exchange unit, means for flowing such liquid therethrough, a plurality of anion exchange units, means for flowing the effluent from said first unit successively through mediate ion exchange treatment, and separate means for regenerating said anion exchange units.

7. Apparatus for conditioning water containing dissolved salts of both strong and weak acids comprising in series a hydrogen ion exchange unit, an anion exchange unit, a degasifier and another anion exchange unit, and means for passing said water successively therethrough.

8. Apparatus for conditioning water containing dissolved salts of both strong and weak acids comprising in series a hydrogen ion exchange unit, an anion exchange unit, a degasifier and another anion exchange unit, means for passing said water successively therethrough, separate means for regenerating said anion exchange units, and means for returning waste regenerant from the second of said anion exchange units to be utilized in regenerating the first of said anion exchange units.

9. Apparatus for conditioning water containing dissolved salts of both strong and weak acids comprising in series a hydrogen ion exchange unit, an air scrubbing degasifier and an anion exchange unit, and means for passing said water successively therethrough.

10. A process of removing weak acids from water containing both strong and weak acids including carbonic acid which comprises flowing such water through a degasifier to remove carbon dioxide, thereafter flowing such water through a bed of anion exchanger, and regenerating said bed of anion exchanger before substantial quantities of weak acids appear in the effluent therefrom.

11. A process of removing dissolved solids from water containing salts of both weak and strong acids which comprises flowing such water through a bed of hydrogen cation exchanger, thereafter flowing the water through a degasifier to remove carbon dioxide, then flowing the water through a bed of anion exchanger, and regenerating said anion exchanger before substantial quantities of weak acids appear in the effluent therefrom.

12. A process as defined in claim 1 in which the weak acids are silicic acids.

13. A process as defined in claim 10 in which the weak acids are carbonic and silicic acids.

ROLAND THOMAS PEMBERTON.
ERIC LEIGHTON HOLMES.

REFERENCES CITED

The following references are of record in the file of this patent:

UNITED STATES PATENTS

| Number | Name | Date |
| --- | --- | --- |
| 2,117,631 | Seyb | May 17, 1938 |
| 2,127,310 | Riley | Aug. 16, 1938 |
| 2,214,689 | Burrell | Sept. 10, 1940 |
| 2,248,055 | Bird | July 8, 1941 |
| 2,264,402 | Pattock | Dec. 2, 1941 |
| 2,267,841 | Riley | Dec. 30, 1941 |
| 2,287,284 | Behrman | June 23, 1942 |
| 2,301,669 | Ritcher | Nov. 10, 1942 |
| 2,404,367 | Durant et al. | July 23, 1946 |
| 2,422,054 | Tiger | June 10, 1947 |

OTHER REFERENCES

Water and Sewage, vol 81, No. 10, pages 13–16, 42–44, 1943.